(12) United States Patent
Hubert et al.

(10) Patent No.: US 11,290,881 B2
(45) Date of Patent: Mar. 29, 2022

(54) METHOD FOR FUNCTIONALLY SECURE CONNECTION IDENTIFICATION

(71) Applicant: Siemens Aktiengesellschaft, Munich (DE)

(72) Inventors: Johannes Hubert, Burgthann (DE); Thomas Markus Meyer, Nuremberg (DE); Ulrich Taschke, Fürth (DE); Herbert Barthel, Herzogenaurach (DE); Maximilian Walter, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 16/411,489

(22) Filed: May 14, 2019

(65) Prior Publication Data
US 2019/0357042 A1 Nov. 21, 2019

(30) Foreign Application Priority Data
May 15, 2018 (EP) .................................. 18172386

(51) Int. Cl.
*H04L 29/06* (2006.01)
*H04W 12/06* (2021.01)
*H04W 12/106* (2021.01)

(52) U.S. Cl.
CPC ......... *H04W 12/06* (2013.01); *H04L 63/0876* (2013.01); *H04W 12/106* (2021.01)

(58) Field of Classification Search
CPC ............... H04W 12/06; H04W 12/106; H04L 63/0876; H04L 12/40; H04L 67/12;
(Continued)

(56) References Cited

U.S. PATENT DOCUMENTS

| 7,107,358 B2 * | 9/2006 | Vasko | G05B 19/4185 |
| | | | 709/249 |
| 8,181,060 B1 * | 5/2012 | Day | H04L 67/141 |
| | | | 714/4.1 |

(Continued)

FOREIGN PATENT DOCUMENTS

| CN | 101069170 | 11/2007 |
| CN | 101656749 | 2/2010 |

(Continued)

*Primary Examiner* — Beemnet W Dada
(74) *Attorney, Agent, or Firm* — Cozen O'Connor (57) ABSTRACT

A method for functionally secure connection identification during data exchange between two communication subscribers in a communication system, wherein a first subscriber operates as a data provider with a first address identifier and a second subscriber operates as a data requester with a second address identifier, wherein in a request of safety-related data of the first subscriber in a request message, the second subscriber transmits an order number of the data request and its second address identifier and the first subscriber responds with a response message, the second subscriber subsequently checking to determine whether this message contains (i) a second address identifier of the requesting second subscriber, (ii) an order number of the request message of the second subscriber and (iii) the first address identifier of the requested first subscriber, in the event all checking steps are positive, the safety-related data being accepted and otherwise discarded.

9 Claims, 4 Drawing Sheets

(58) Field of Classification Search
CPC ....... H04L 63/205; H04L 63/12; H04L 63/08; G05B 19/0425
See application file for complete search history.

(56) References Cited

U.S. PATENT DOCUMENTS

| | | | |
|---|---|---|---|
| 2003/0231642 A1* | 12/2003 | Mao | H04L 67/06 370/401 |
| 2005/0249112 A1 | 11/2005 | Barthel et al. | |
| 2006/0059286 A1 | 3/2006 | Bertone et al. | |
| 2014/0044004 A1* | 2/2014 | Oda | H04L 41/5067 370/253 |
| 2015/0058925 A1* | 2/2015 | Curry | H04L 63/08 726/3 |
| 2019/0029033 A1* | 1/2019 | Tang | H04W 72/1284 |

FOREIGN PATENT DOCUMENTS

| | | |
|---|---|---|
| CN | 104731007 | 6/2015 |
| CN | 105592107 | 5/2016 |
| EP | 1596262 | 11/2005 |
| WO | WO2013/147734 | 10/2013 |
| WO | WO 2017/166213 | 10/2017 |

* cited by examiner

METHOD FOR FUNCTIONALLY SECURE CONNECTION IDENTIFICATION

BACKGROUND OF THE INVENTION

1. Field of the Invention

The invention relates to a method for functionally secure connection identification during a data exchange between two communication subscribers in a communication system, where a first communication subscriber operates as a data provider with a first address identifier and a second communication subscriber as a data requester with a second address identifier.

2. Description of the Related Art

Functionally secure communication and connection identification is realized, for example, via PROFIsafe.

The system description "PROFIsafe System Description, Technology and Application", Version November 2010, Order Number 4.3.4.1, Publisher PROFIBUS Nutzerorganisation e.V. (PNO) describes the realization of safety-relevant communication and in particular, of secure connection identification in PROFIBUS and PROFINET protocols.

The manual "SIMATIC, Industrial Software S7 F/FH Systems—Configuring and Programming", Edition 05/2009, A5E00048979-06 also describes safety-relevant communication, in particular in SIMATIC controllers.

What all the above-mentioned and conventional methods for safety-relevant communication, in particular in automation technology, have in common is that the address relationship, comprising the target and source address, for example, of PROFIBUS or PROFINET subscribers, is permanently configured.

The PROFIsafe security protocol is mentioned as an example. In the case of PROFIsafe, a 32-bit code name corresponding to an address relationship is used for unique connection identification.

In functionally secure communication, such as in the case of PROFIsafe, it must be guaranteed that a residual fault rate per time unit is sufficiently small. Taken into consideration are damage to data integrity (data integrity is checked via a signature, e.g., CRC), authenticity (authenticity is checked via a comparison with a source and target address or with a code name) and timelines (timelines means: message data can only be used if it is received in the correct sequence and in good time).

Particularly in the case of communications in newer industrial plants, it should be possible for communication relationships to change frequently and quickly, i.e., a communication subscriber requires information from a certain other communication subscriber at one time and from another communication subscriber at another time. Examples of this are reconfigurable modular machines, driverless transport systems (AGVs), tool changers, clamping frames, and/or crane trolleys.

In accordance with the disclosed prior art, a functionally secure communication connection must be permanently programmed and configured between all potential communication partners. In the case of n subscribers, these are up to $n \cdot (n-1)$ connections, of which at one time only a very small proportion is active simultaneously in each case. For each of these connections, however, a unique authentication code (AA code for Profisafe: code name) that serves to securely identify addressing errors (i.e., delivery of a communication message to an incorrect receiver) must be assigned.

SUMMARY OF THE INVENTION

It is an object of the present invention to simplify the previously used functionally secure communication method or the functionally secure connection identification such that the source and target addresses need not be compared in the subscribers every time or a default communication connection with the code name permanently configured every time.

This and other objects and advantages are achieved in accordance with the invention by a method for functionally secure connection identification during a data exchange between two communication subscribers in a communication system, where a first communication subscriber operates as a data provider with a first address identifier and a second communication subscriber as a data requester with a second address identifier. In the event of a request for safety-oriented data of the first communication subscriber, the second communication subscriber sends an order number of the data request and its second address identifier to the first communication subscriber in a request message, and the first communication subscriber responds with a response message comprising the safety-related data, the first address identifier, the order number and the second address identifier. Here, after receipt of the response message in the second communication subscriber, this message is checked as to whether it contains the second address identifier of the requesting second communication subscriber, whether this message contains the order number of the request message of the second communication subscriber and whether this message comprises the first address identifier of the requested first communication subscriber. In the event that all the checking steps are positive, the safety-related data is accepted and otherwise discarded.

Advantageously, a method has now been provided in which it is possible to realize functionally secure connection identification in which it is no longer necessary for a monitoring mechanism to be implemented on the part of the data provider with regard to the communication relationship. With this method for functionally secure connection identification, a "relationship-flexible functionally secure communication with unilateral checking" is obtained. Despite simplification, all safety-related requirements such as topicality, i.e., timeliness, authenticity and integrity are now met. A monitoring mechanism on the part of the data provider is no longer necessary. Also, time information no longer needs to be stored in the message of the data provider, but a data request with the following two items of data information is sent to the data provider in the data requester a) the ID/address of the data requester, i.e., the first address identifier and b) an order number of the data requester. The data provider copies the two items of data information from the message of the data request into a message of the data provider and adds the following data to these two items of data information: c) the current process data, d) the ID address/of the data provider, i.e., the first address identifier whereby relationship-flexible functionally secure communication with unilateral checking is obtained. The data a) to d) is now checked in the data requester.

To further improve the method, in the first communication subscriber a checksum for the safety-related data, the first address identifier, the order number and the second address identifier is also generated and included in the response message, and after receipt of the response message in the second communication subscriber, the checksum generated for the data a) to d) is checked for accuracy.

The method is further improved in that in the second communication subscriber, in the event of a request of the safety-related data a time counter for a monitoring time is started and is assigned to the request telegram, and in the second communication subscriber a check is additionally made as to whether the associated response message has arrived within the monitoring times after the request message has been sent, otherwise substitute values are provided for the requested safety-related data.

Accordingly, the second communication partner monitors the time between a request and the receipt of the response message associated with an order number with the time of a watchdog timer and at the end of the watchdog time before the receipt of the expected response message, initiates a safety-related response, for example, providing substitute values.

Transmission security can also be improved if data structures are used in the requested safety-related data, where a checksum is additionally generated via the data structure in the first communication subscriber and sent with the response message.

Advantageously, a data-specific representative is assigned to the data types contained in the data structure for securing the data structure in the first communication subscriber, and subsequently the checksum is generated via the representatives, and then the data structure is transmitted with the checksum generated via the representatives, where the data type-specific representative is again assigned to the data types contained in the received data structure in the second communication subscriber and the checksum is again generated via the representatives, where the transmitted and recalculated checksum is checked on the side of the second communication subscriber and in the event of a deviation, data corruption is detected within the data structure.

With respect to a multiple communication comprising, for example, a data provider and many data requesters, the method is improved in that during a data exchange between a plurality of communication subscribers in a communication system at least the first communication subscriber operates as a data provider and a plurality of other communication subscribers operate as data requesters, where it is determined in the first communication subscriber how many data requesters request data at a particular point in time and this determined number is then communicated to a further data requester that can then decide whether to reset its request. With this optional supplement, an F-Data provider can determine how many F-Data requesters request F-Data in a current period and if only a limited number of F-Data requesters can be operated within a short time, the F-Data provider can advise how many data requesters have registered. This enables a "new" F-Data requester to detect whether it should reset its F-Data request or can place it immediately. Furthermore, the individual data requesters can use the number of registered data consumers to reduce, for example, a driving speed in a process and thus permit a longer response time.

The method is used advantageously for fail-safe controller-to-controller communication in which data structures are designed according to the OPC UA standard.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The diagrams show an exemplary embodiments of the invention in which.

DETAILED DESCRIPTION OF THE EXEMPLARY EMBODIMENTS

Figure 1:
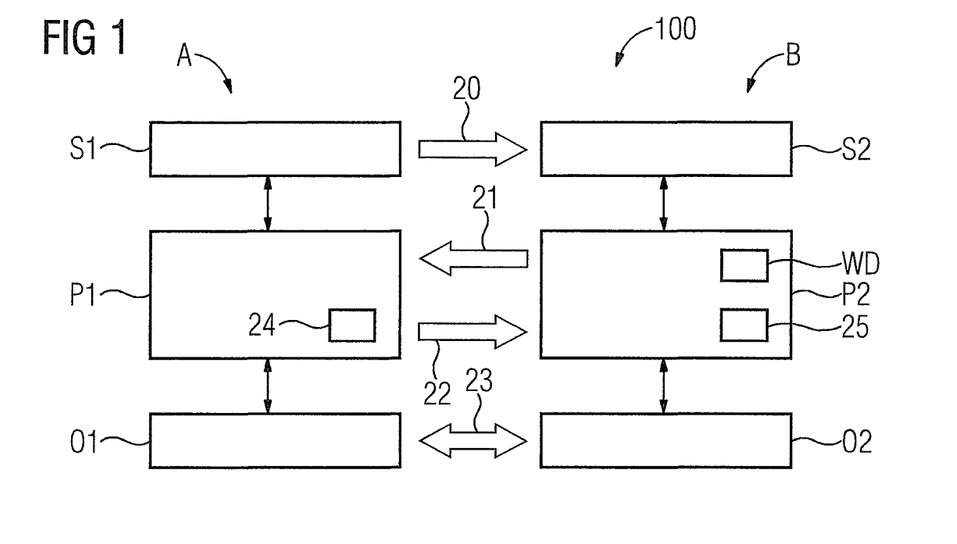
FIG. 1 is a basic diagram of a communication system with functionally secure communication in accordance with the invention.

FIG. 1 shows a communication system 100 for functionally secure communication between a first communication subscriber A and a second communication subscriber B. The first communication subscriber A comprises a first security application S1, a first security device P1 and a first Object Linking and Embedding for Process Control Unified Architecture (OPC UA) service device O1. The first security application S1 can be, for example, an emergency stop device or a controller for a sluice gate.

The first security device P1 is a program which, in accordance with the specifications of a security standard, for example, PROFIsafe, has now been extended to realize a "Safety Over OPC UA". The previously known PROFIsafe method is now expanded to include security for OPC UA data in the PROFIsafe environment.

The first OPC UA service device O1 can, for example, be configured as an OPC UA server or as an OPC UA communication stack.

The second communication subscriber B essentially has an analog structure. An OPC UA communication 23 is now realized between the first OPC UA service device O1 and a second OPC UA service device O2. In turn, the second OPC UA service device O2 is now connected to a second security device P2 in which the standard is realized. A second security application S2 is placed on the second security device P2.

The first communication subscriber A operates as a data provider and can thus provide data to the second communication subscriber B in a data supply direction 20. Accordingly, the second communication subscriber B operates as a data requester. In the event of a request 21 of safety-related data F-Data of the first communication subscriber A, the second communication subscriber B will send an order number $Req.Nr_i$ of the data request and a second address identifier ID_B to the first communication subscriber A in a request message 30 (see FIG. 4). Thereupon, the first communication subscriber A responds with a response message 31 (see FIG. 4) comprising the safety-related data F-Data, the first address identifier ID_A, the order number Req.Nr$_i$ and the second address identifier ID_B.

After receipt of the response message 31 in the second communication subscriber B, a check is made to determine whether this message contains the second address identifier ID_B of the requesting second communication subscriber B, and whether this message contains the order number Req.Nr$_i$ of the request message 30 of the second communication subscriber B and whether this message comprises the first address identifier ID_A of the requested first communication subscriber A. In the event that all the checking steps are positive, the safety-related data F-Data is accepted and otherwise discarded. These checking steps are realized as software in the second security device P2.

Furthermore, in the second security device P2 it is realized that in the event of a request of safety-related data F-Data, a time counter WD is started for a monitoring time and is assigned to the request message 30, and in the second communication subscriber B it is additionally checked whether the associated response message 31 has arrived within the monitoring time after the request message 30 has been sent, otherwise, substitute values FV are provided for the requested safety-related data F-Data.

A device 24 for determining the number of data requests is implemented in the first security device P1. In a data exchange between a plurality of communication subscribers in a communication system 100, where at least the first communication subscriber operates as a data provider and a plurality of other communication subscribers B operate as data requesters, advantageously, in the first communication subscriber A the device 24 for determining the number of data requests determines how many data requesters request data at a specific time, and this determined number is then communicated to a further data requester that can then decide whether to reset its request. The second security device P2 has a reset device 25 for this purpose.

Figure 2:
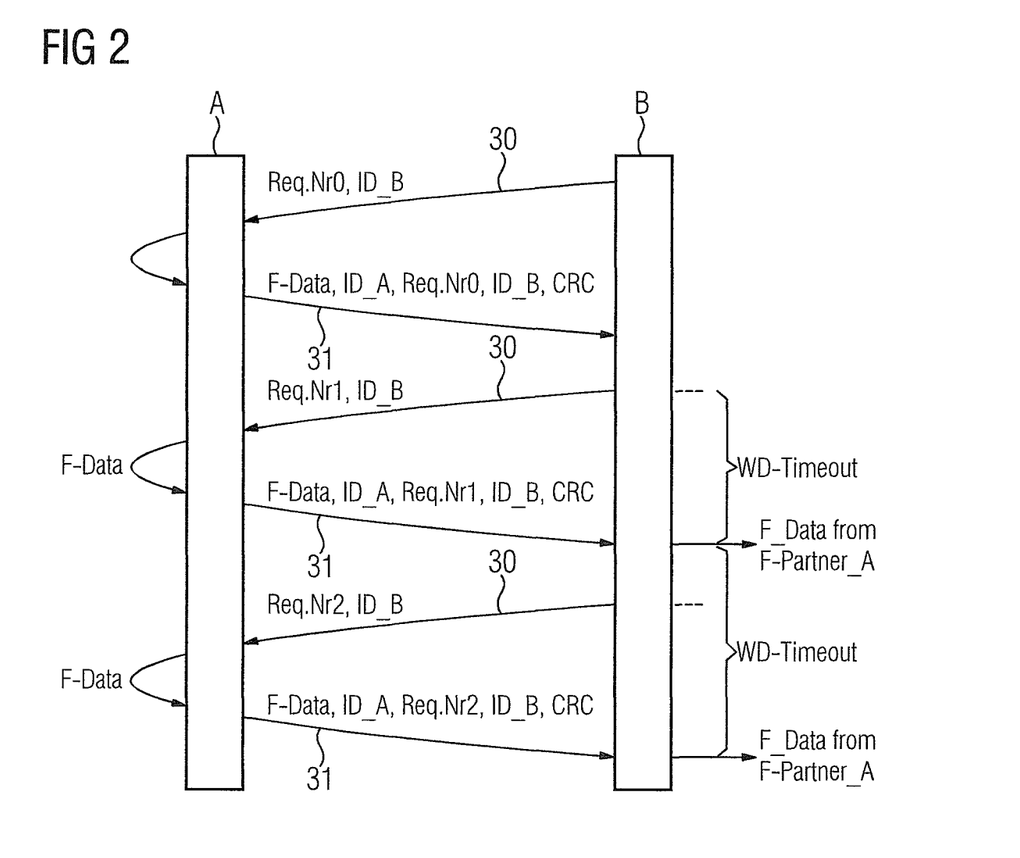
FIG. 2 is a diagram of the temporal sequence of request messages of a second communication partner to a first communication partner in accordance with the invention.

FIG. 2 shows 1:1 unidirectional communication between the first communication subscriber A and the second communication subscriber B. For a secure connection identification which realizes relationship-flexible safety communication with unilateral checking, in accordance with the method a request message 30 with an order number Req.Nr$_0$ and its own second address identifier ID_B is sent by the second communication subscriber B. In response, the second communication subscriber B receives a response message 31 from the first communication subscriber A with the requested safety-related data F-Data, the first address identifier ID_A of the first communication subscriber A and the second address identifier ID_B of the second communication subscriber B and an additional checksum CRC.

In this method, an advantage for the data provider, i.e., the first communication subscriber A, is that this can be configured more simply, the latter no longer needs to know the data consumer, i.e., the second communication subscriber B.

The message requests, i.e., the transmission of request messages 30 occurs cyclically. The data consumer, in other words, the second communication subscriber B, is now responsible for the sequence, the authenticity, the timelines, the connection ID and the consecutive order number, also referred to as a request number.

The safety-related data is normally status information, as can also be seen in the examples mentioned: status "Emergency stop pressed yes/no" or "Bridge open yes/no".

The maximum safety function response time (in IEC 61784-3, the SFRT) must be complied with in the applications concerned and therefore, the data requester must send a new data request as soon as possible after receipt of the response message in order to always obtain the current status of the information. This is repeated cyclically for as long as this safety function is required (for example, as long as the ship in the example is located in front of or under the bridge).

Figure 3:
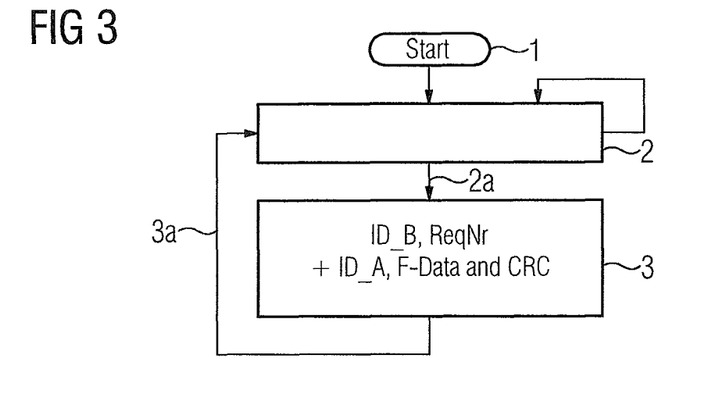
FIG. 3 shows a state graph for a program sequence in the first communication partner in accordance with the invention.

FIG. 3 shows a state machine for a program sequence to be implemented in the first security device P1. Here, it is essential that the first communication subscriber A only has to respond to a request or a request message 30.

Starting from a Start 1 of the data provider, a "Waiting for request" state 2, which is cyclically checked, is reached. If the data provider has received a request 2a, then he requests a response message 31 "Compile and send response message" 3. Compilation occurs as follows: take the second address identifier ID_B and the order number Req.Nr$_i$ of the requesting communication subscriber, i.e., in this case, of the second communication subscriber B and add their own first address identifier ID_A, the safety-related F-Data data and a checksum CRC. After successful compilation of the response message 31, the "Send response message" state 3 can be left via "Response message sent" 3a and the state graph is again in the "Waiting for request" state 2.

Figure 4:
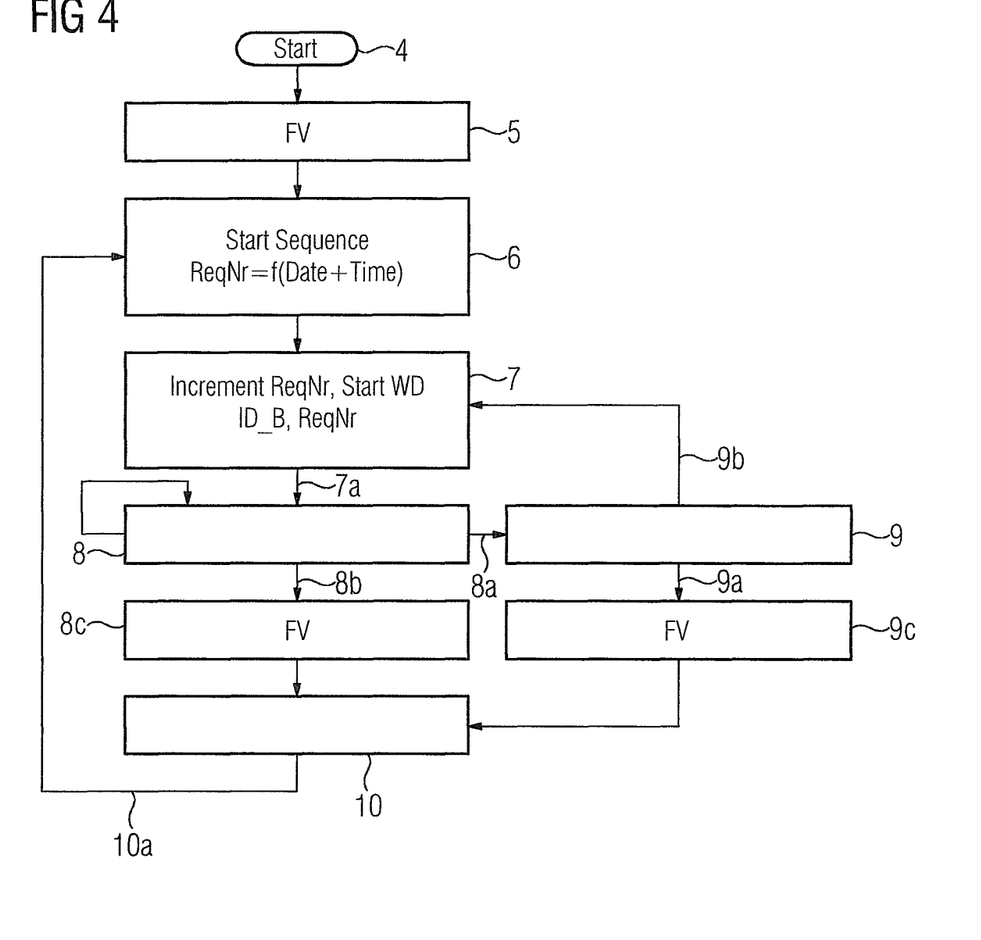
FIG. 4 shows a state graph for a program sequence in the second communication partner in accordance with the invention.

FIG. 4 shows the state graph for implementation in the second communication subscriber B or in the second security device P2.

Starting from a start 4 of the data requester, an instruction "use/set substitute values FV" 5 is reached. The "Start sequence (generate order number)" state 6 generates an order number Req.Nr$_i$ as a function of the date and time. This is followed by a "Send request/Start time counter state" 7. Accordingly, the request message 30 is sent from here, while at the same time the order number Req.Nr$_i$ is incremented and a time counter WD started. State 7 is left via "Request sent" 7a and a "Waiting for response" state 8 is reached. As long as the time counter WD, i.e., the watchdog, is now running, a response message 31 can be awaited here in an error-free manner.

If the response message 31 is received within the time span of the time counter WD, a checking state 9 is reached via "Receive" 8a. The checking steps are performed here. The following are tested: 1. Whether any data message has been received within the monitoring time after sending the data request and 2. Whether the message contains the address identifier of the data requester, whether this message contains the order number of the last data request, 4. Whether this message contains the address identifier of the requested data provider, 5. Whether the signature of the data is correct and if all the checking steps 1 to 5 are positive, the data is accepted and a message "Measured values OK" 9b generated, thus using the process values, i.e., the safety-related F-Data data.

If the test has failed, the action of discarding data is initiated via "Error detected/Discard data" 9a and the substitute values FV are activated via "Use/Set substitute values" 8c. Further diagnostic messages 10a can now be generated via an error state 10.

Figure 5:
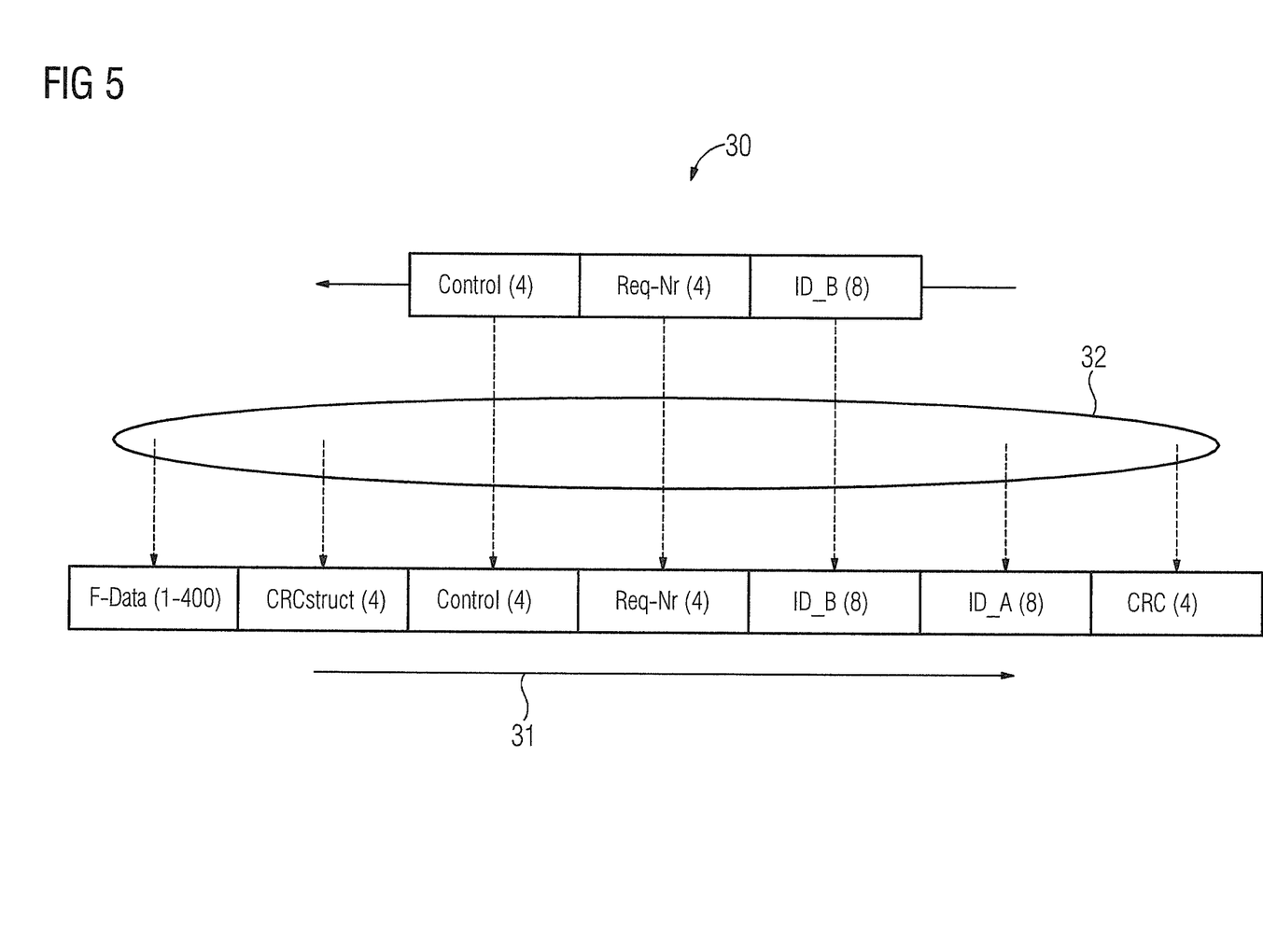
FIG. 5 an exemplary message structure of a request message and a response message in accordance with the invention.

FIG. 5 shows an example of a message structure both for the request message 30 and for the response message 31. When the request message 30 has reached the data provider, the data provider performs actions 32. This means that the request message 30 is supplemented by the first address identifier ID_A, by a checksum CRC, by a further checksum CRC$_{struct}$, which is particularly used for the detection of permutations in data structures, and the order number Req.Nr$_i$ and the second address identifier ID_B already sent in the request message 30 are copied.

The number of available bytes is given in brackets in each case. FIG. 5 also shows a possible extension of the message in the form of an item of Control control information, which is also included in the request message 30. In this way, the data requester also sends the data provider an item of Control control information, which is also returned in the response of the data provider and on the basis of which the data requester checks whether the correct Control control information has been executed. For example, the data requester could send the Control control information in the data request, which influences the response of the data provider, for example, the Control control information could be "give me date number X", whereupon the data provider must provide "Date number X" in its response, in addition to the Control control information.

Examples of applications for relationship-flexible safety communication with unilateral checking would be, for example, as follows:

Emergency Stop in Modular Machines

For emergency stop buttons, the rule in safety technology is that all machines in the field of vision of the actuator must stop when the emergency stop button is pressed. This means that the machine to which the emergency stop button is connected must forward the information "Emergency stop button has been pressed/not yet been pressed" to all other machines in the field of vision of a potential actuator. In order to avoid potentially dangerous mix-ups, it must be possible to uniquely assign each emergency stop message to the sender. Conversely, here it is not necessary for the transmitter to be able to check whether a message has reached the correct receiver as the secure response can only occur in the receiver in any case.

In accordance with the prior art, an authenticity code would be assigned to each emergency stop button and each receiver of emergency stop signals. The receivers each know the codes of their transmitter and, conversely, the transmitters know the code of their receiver. The addition of a new machine, i.e., of a new receiver, therefore necessitates the adaptation of all the transmitters.

As a result of the relationship-flexible communication now available, an adaptation of the transmitter is not required. Only the newly added receiver must be informed as to which emergency stop signals it must regularly receive, and what the associated transmitter IDs are.

Passage of Ships Through Movable Bridges

In this scenario, a barge asks if passage is possible at a movable bridge. The bridge operates as a data provider, and the barge operates as a data consumer. Of relevance to safety here is that the barge can check whether it is communicating with the correct bridge, rather than, for example, with the bridge behind it. All bridges are assigned a transmitter ID, which all ships must know. Conversely, however, for safe operation it is not essential that the bridges can identify the ships. As a result of relationship-flexible communication, new ships can therefore be put into operation without re-parameterizing the bridges.

In accordance with the prior art, the ships would also have to be provided with codes known to the bridges. The commissioning of a new ship then requires the adaptation of all the bridges.

Figure 6:
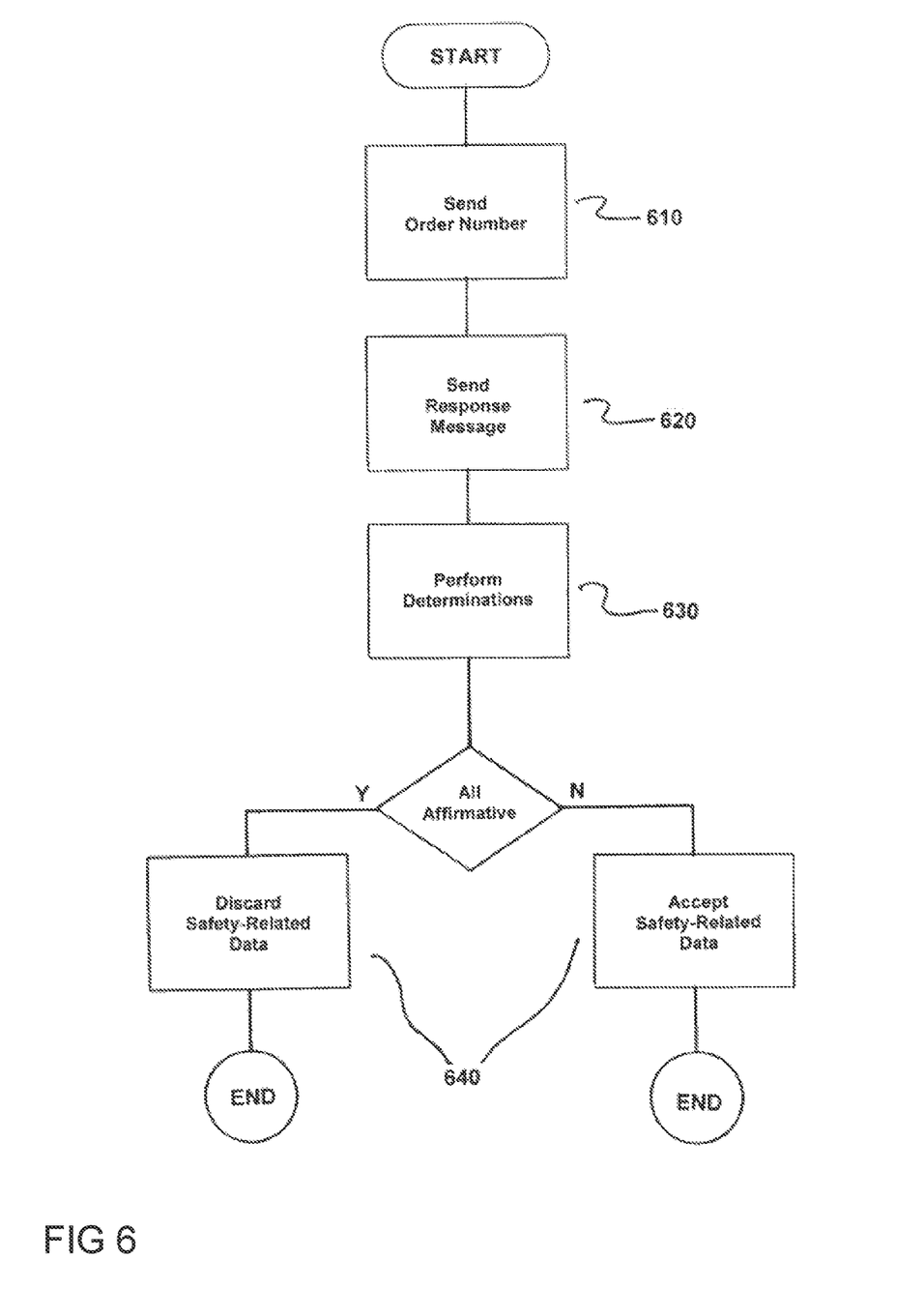
FIG. 6 is a flowchart of the method in accordance with the invention.

FIG. 6 is a flowchart of the method for functionally secure connection identification during a data exchange between two communication subscribers A, B in a communication system 10, where a first communication subscriber A operates as a data provider with a first address identifier ID_A and a second communication subscriber B operates as a data requester with a second address identifier ID_B. The method comprises sending, by the second communication subscriber B, an order number Req.Nr$_i$ of the data request and its second address identifier ID_B to the first communication subscriber A, via a request 21 of safety-related data F-Data of the first communication subscriber A in a request message 30, as indicated in step 610.

Next, the first communication subscriber A responds with a response message 31 comprising the safety-related data F-Data, the first address identifier ID_A, the order number Req.Nr$_i$ and the second address identifier ID_B, as indicated in step 620.

Next, a determination is made, after receipt of the response message 31 in the second communication subscriber B, whether the message contains the second address identifier ID_B of the requesting second communication subscriber B, whether this message contains the order number Req.Nr$_i$ of the request message 30 of the second communication subscriber B and whether this message comprises the first address identifier ID_A of the requested first communication subscriber A, as indicated in step 630.

Next, the safety-related data (F-Data) are accepted in an event that all checks are positive, otherwise the safety-related data F-Data are discarded when any of the checks is not positive, as indicated in step 640.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for functionally secure connection identification during a data exchange between two communication subscribers in a communication system, a first communication subscriber operating as a data provider with a first address identifier and a second communication subscriber operating as a data requester with a second address identifier, the method comprising:

sending, by the second communication subscriber, an order number of the data request generated based on date and time and its second address identifier to the first communication subscriber, via a request of safety-related data of the first communication subscriber in a request message;

responding, by the first communication subscriber with a response message comprising the safety-related data, the first address identifier, the order number and the second address identifier;

determining, after receipt of the response message in the second communication subscriber, whether said message contains the second address identifier of the requesting second communication subscriber, whether this message contains the order number of the request message of the second communication subscriber and whether this message comprises the first address identifier of the requested first communication subscriber; and accepting the safety-related data in an event that all checks are positive, otherwise discarding the safety-related data when any of the checks is not positive.

2. The method as claimed in claim 1, wherein a checksum for the safety-related data, the first address identifier, the order number and the second address identifier is also generated in the first communication subscriber and included in the response message;

wherein a checksum generated for the data is checked for accuracy after receipt of the response message in the second communication subscriber.

3. The method as claimed in claim 1, wherein a time counter for a monitoring time is started in the second communication subscriber in a request of the safety-related data and assigned to the request message, and checking in the second communication subscriber checked whether the associated response message has arrived within the monitoring time after sending the request message, otherwise substitute values are provided for the requested safety-related data.

4. The method as claimed in claim 2, wherein a time counter for a monitoring time is started in the second communication subscriber in a request of the safety-related data and assigned to the request message, and checking in the second communication subscriber checked whether the associated response message has arrived within the monitoring time after sending the request message, otherwise substitute values are provided for the requested safety-related data.

5. The method as claimed in claim 1, wherein in an event that the requested safety-related data comprises a data structure, a checksum for the data structure is also generated in the first communication subscriber and included in the response message.

6. The method as claimed in claim 5, wherein in order to secure the data structure in the first communication subscriber, the data types contained in the data structure are assigned a data-specific representative, and subsequently the checksum is generated via the representatives, and then the data structure is transmitted with the checksum generated by means of the data-specific representatives;

wherein the data type-specific representative is re-assigned to the data types contained in the received data structure in the second communication subscriber; and wherein the checksum is re-generated via the representatives, the transmitted and newly calculated checksum is checked on the side of the second communication subscriber and in an event of a deviation, data corruption within the data structure is detected.

7. The method as claimed in claim 1, wherein in an event of a data exchange between a plurality of communication subscribers in a communication system, at least the first communication subscriber operates as a data provider and a plurality of other communication subscribers operate as data requesters; and wherein a number of data requesters requesting data in a given period is determined in the first communication subscriber and said determined number is subsequently communicated to a further data requester which then decides whether to reset its request.

8. The method as claimed in claim 5, wherein the data structure is in accordance with the Open Platform Communications (OPC) Uniform Architecture (UA) standard.

9. The method as claimed in claim 6, wherein the data structure is in accordance with the Open Platform Communications (OPC) Uniform Architecture (UA) standard.

* * * * *